Sept. 6, 1966 D. J. COCHRAN ET AL 3,271,526
SERVO SYSTEM THAT IS INSENSITIVE TO TAPE FLUTTER ERRORS
Filed Nov. 5, 1962
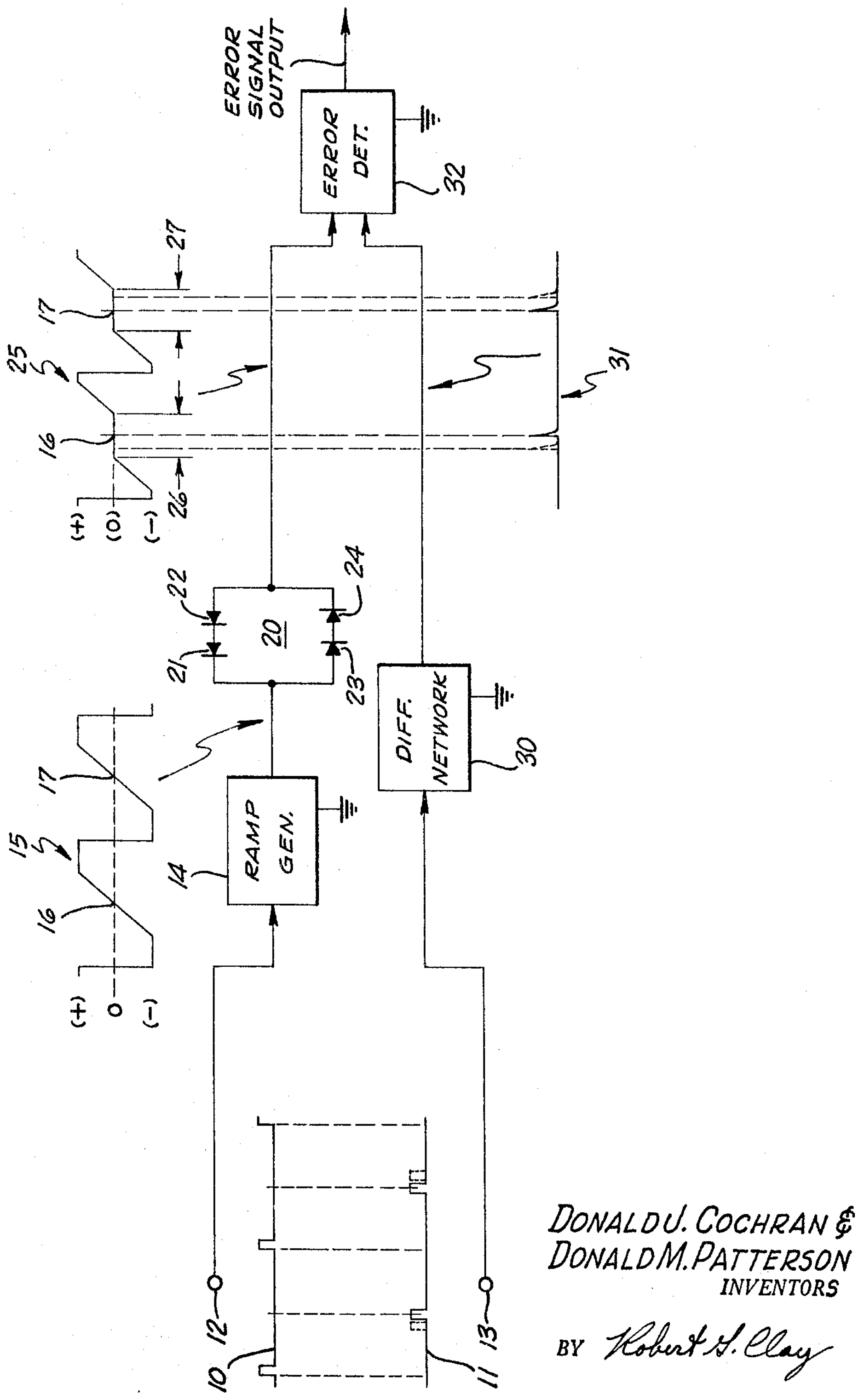
DONALD J. COCHRAN &
DONALD M. PATTERSON
INVENTORS
BY Robert G. Clay
ATTORNEY United States Patent Office 3,271,526
Patented Sept. 6, 1966

3,271,526
SERVO SYSTEM THAT IS INSENSITIVE TO TAPE FLUTTER ERRORS

Donald James Cochran, Pacifica, and Donald Marvin Patterson, Sunnyvale, Calif., assignors to Ampex Corporation, Redwood City, Calif., a corporation of California Filed Nov. 5, 1962, Ser. No. 235,376
6 Claims. (Cl. 179—100.2)

This invention relates to speed control servo systems, and more particularly to improved speed control servo systems for magnetic tape record-playback apparatus.

In magnetic tape recording and playback of high frequency signals, such as television signals, a speed control servo system is needed to ensure that longitudinal tape position relative to a head drum position is exactly the same in a playback mode as it was in a record mode. The speed control servo system locks the tape motion from reel-to-reel to the rotation of the head drum so that a previously recorded control track will pass over a control track head. During the record mode, a pulse generating means generates a pulse for each revolution of the head drum. The pulses are amplified and then recorded along one margin of the magnetic tape by the control track head. During playback, the control track pulses on the magnetic tape are reproduced and fed into a ramp generator for generating a ramp pulse for each control track pulse. While the control pulses on the magnetic tape are being reproduced, the pulse generating means is generating a sampling pulse for each revolution of the head drum. Such head drum sampling pulses generated during playback are fed into a differentiating network to produce sharp sampling pulses. Each sharp sampling pulse is compared with one ramp pulse and any difference in time between the two pulses is detected by an error detector to produce an error voltage which is used to speed up or slow down the head drum motor. Therefore, longitudinal tape position relative to the head drum position is exactly the same during the playback mode as it was during the record mode.

In the past, a speed control servo system utilizing a sampled ramp time comparator has been used to synchronize the position of a head drum relative to the position of a magnetic tape during playback. The loop gain of the speed control servo system is proportional to the slope of a ramp pulse waveform. Thus, a ramp pulse waveform having a steep slope provides a high gain servo system which locks the tape motion from reel-to-reel to the rotation of a head drum. The use of a high gain servo system, however, although desirable to improved synchronization, give rise to certain disadvantages and drawbacks, such as making the locked-in servo system very sensitive to tape flutter errors. The high loop gain of the locked-in servo system amplifies the tape flutter errors which cause the speed of a head drum motor to change randomly. Tape flutter errors, therefore, pull the locked-in servo system out of synchronization, thereby distorting a video picture. Thus, prior high gain servo systems were very sensitive to tape flutter errors which caused locked-in servo systems to be pulled out of synchronization.

It is, therefore, the principal aim of this invention to provide an improved magnetic tape servo system that does not have the disadvantages and drawbacks of prior magnetic tape servo systems. This is accomplished by providing a diode pulse shaping means for shaping ramp pulse waveforms so that they have flat sections at their zero crossover points. The output voltage of the diode pulse shaping means is zero in the flat sections due to the saturation voltage drops appearing across the diodes. The width of the flat section of a ramp waveform curve is determined by the number of diodes used in the pulse shaping means. Since the loop gain of the servo system in the flat sections is zero, the servo system does not detect tape flutter errors falling within these sections. The servo system, therefore, remains locked-in for the entire flat section of each ramp pulse curve. Thus, the present invention provides a simple and inexpensive way of making a magnetic tape servo system insensitive to tape flutter errors so that they do not pull the locked-in servo system out of synchronization.

It is therefore, the main object of this invention to provide an improved speed control servo system for a magnetic tape record-playback apparatus.

It is another object of this invention to provide a simple and inexpensive way of making a speed control servo system insensitive to tape flutter errors.

Other objects and advantages of this invention will be apparent from the following detailed description of a preferred embodiment of the invention when taken with the drawing which shows in the sole figure a schematic diagram of the preferred embodiment of the invention.

Referring now to the sole figure, there is shown a speed control system for a magnetic tape record-playback apparatus. During the playback mode, previously recorded pulses on a magnetic tape (not shown) are reproduced by a control track head (not shown). The waveform of the control track output is illustrated by reference numeral 10. The reproduced control track pulses are applied to an input terminal 12 and then fed into a ramp generator 14 for generating a ramp pulse for each control track pulse. The output waveform of the ramp generator 14 is illustrated by reference numeral 15 (two being shown). The sloping portion of the ramp pulses of each waveform 15 have zero crossover points 16 and 17, respectively.

In accordance with the present invention, there is provided a pulse shaping network 20 comprising four diodes 21, 22, 23 and 24. The pulse shaping network 20 shapes the ramp pulse curves so that they have flat sections 26 and 27 at their zero crossover points 16 and 17, respectively. The output waveform of the pulse shaping network 20 is illustrated by reference numeral 25. The output voltage of the pulse shaping network 20 is zero in the flat sections 26 and 27 due to the saturation voltage drops appearing across the diodes 21, 22, 23 and 24. The width of each of the flat sections 26 and 27 of the ramp pulse curves is determined by the number of diodes used in the pulse shaping network 20. The loop gain of the speed control servo system is proportional to the slope of the ramp pulses. Thus, since the slope of the flat sections 26 and 27 of the ramp pulses is zero, the loop gain of the servo system for these sections 26 and 27 is also zero. The servo system, therefore, does not detect tape flutter errors and remains locked-in for the flat sections 26 and 27 of the ramp pulse curves.

While the control track pulses, as illustrated by waveform 10, are being reproduced, a pulse generating means (not shown) is generating a sampling pulse for each revolution of a head drum (not shown). The waveform of the head drum output is illustrated by reference numeral 11. The head drum sampling pulses are applied to input terminal 13 and then fed into a differentiating network 30 to produce sharp sampling pulses. The output waveform of the differentiating network 30 is illustrated by reference numeral 31. Each sharp sampling pulse is compared with one ramp pulse and any difference in time between the two pulses is detected by an error detector 32 to produce a positive or negative error voltage which is used to speed up or slow down a head drum motor (not shown). However, tape flutter errors due to the tape slowing down or speeding up, as represented by dotted sampling pulses, fall within the flat section 26 and 27. Therefore, time differences between the dotted sampling pulses and the ramp pulses are not detected by the error detector 32. Thus, the speed control servo system is insensitive to tape flutter errors and remains locked-in for the flat sections 26 and 27 of the ramp pulse curves.

In the record operation, vertical synchronization pulses are stripped from video information by a sync stripping network (not shown). The vertical synchronization pulses are then fed into the ramp generator 14 to produce ramp pulses. However, since there are no tape flutter errors during the record mode, the diode pulse shaping network 20 is disabled. A pulse generating means (not shown) generates a sampling pulse for each revolution of a head drum (not shown). The sampling pulses are amplified and then recorded along one margin of a magnetic tape (not shown) by a control track head (not shown). At the same time, each sampling pulse is compared with one ramp pulse and any difference in time between the two pulses is detected by the error detector 32 to produce an error voltage which is used to speed up or slow down a head drum motor (not shown). Thus, during the record mode, the servo system synchronizes the head drum to each television picture field.

In the playback operation, control track pulses, as illustrated by waveform 10, are applied to input terminal 12 and head drum pulses, as illustrated by waveform 11, are applied to input terminal 13. The control track pulses are fed into the ramp generator 14 to produce ramp pulses, as illustrated by waveform 15. The ramp pulses are then fed into the diode pulse shaping network 20 so that the ramp pulses have flat sections 26 and 27 at their zero crossover points 16 and 17, respectively. The output voltage of the diode pulse shaping network 20 is zero in the flat sections 26 and 27 due to the saturation voltage drops appearing across diodes 21, 22, 23 and 24. By way of example, the diodes 21, 22, 23 and 24 are silicon diodes, and each has a saturation voltage drop of .6 volt. Thus, the width of each flat section 26, 27 is determined by the total voltage drop of 2.4 volts across the four diodes 21, 22, 23 and 24. Since the slope of the flat sections 26 and 27 of the ramp pulse curves is zero, the loop gain of the speed control servo system is also zero. Tape flutter errors due to the magnetic tape slowing down or speeding up are represented by time shifting the head drum sampling pulses of waveform 11. This is illustrated on the waveform 11 by dotted head drum sampling pulses. These dotted sampling pulses are differentiated by the differentiating network 30 to produce dotted sharp sampling pulses, which are shown on waveform 31. Tape flutter errors due to tape slowing down or speeding up, as represented by dotted sharp sampling pulses, fall within the flat sections 26 and 27 of the ramp pulse curves of waveform 25. Since the loop gain of the servo system for flat sections 26 and 27 is zero, time differences between the dotted sharp sampling pulses and the ramp pulses are not detected by the error detector 32. The speed control servo system, therefore, is insensitive to tape flutter errors and remains locked-in for the flat sections 26 and 27 of the ramp pulse curves.

Thus, it is seen that the present invention provides a simple and inexpensive way of making a magnetic tape servo system insensitive to tape flutter errors so that they do not pull the locked-in servo system out of synchronization.

Although the present invention has been shown and described in terms of a preferred embodiment, changes and modifications which do not depart from the inventive concepts taught herein will suggest themselves to those skilled in the art. Such changes and modifications are deemed to fall within the scope of the invention.

What is claimed is:

1. A speed control servo system for a magnetic tape record-playback apparatus comprising:

means for generating ramp pulses from a first group of pulses;

means for differentiating a second group of pulses to produce sharp pulses;

means for comparing the time between one sharp pulse and one ramp pulse; and means for shaping the ramp pulses at their zero crossover points to make the servo system insensitive to tape flutter errors.

2. A speed control servo system for a magnetic tape record-playback apparatus comprising:

means for generating ramp pulses from a first group of pulses, said ramp pulses having zero crossover points;

means for differentiating a second group of pulses to produce sharp pulses;

means for comparing the time between one sharp pulse and one ramp pulse; and diode means for shaping the ramp pulses at their zero crossover points to make the servo system insensitive to tape flutter errors.

3. A speed control servo system for a magnetic tape record-playback apparatus comprising:

ramp generating means for generating ramp pulses from a group of previously recorded pulses, said ramp pulses having zero crossover points;

differentiating means for differentiating a group of sampling pulses to produce sharp pulses;

time comparator means for comparing the time between one sharp sample pulse and one ramp pulse; and a diode pulse shaping network for providing the ramp pulses with flat sections at their zero crossover points for making the servo system insensitive to tape flutter errors falling within the flat sections of the ramp pulses.

4. A speed control servo system for a magnetic tape record-playback apparatus comprising:

means for reproducing previously recorded control pulses;

ramp generating means for generating ramp pulses from the previously recorded control pulses, said ramp pulses having zero crossover points;

a head drum;

pulse generating means for generating a sampling pulse for each revolution of said head drum;

differentiating means for differentiating the head drum sampling pulses to produce sharp sampling pulses;

time comparator means for comparing the time between one sharp sample pulse and one ramp pulse; and a diode pulse shaping network for providing the ramp pulses with flat sections at their zero crossover points for making the servo system insensitive to tape flutter errors falling within the flat sections of the ramp pulses.

5. A speed control servo system for a magnetic tape record-playback apparatus comprising:

means for reproducing previously recorded control pulses;

ramp generating means for generating ramp pulses from the previously recorded control pulses, said ramp pulses having zero crossover points;

a head drum;

pulse generating means for generating a sampling pulse for each revolution of said head drum;

differentiating means for differentiating the head drum sampling pulses to produce sharp sampling pulses;

time comparator means for comparing the time between one sharp sample pulse and one ramp pulse;

a diode pulse shaping network comprising at least two parallel-connected diodes with diodes of one branch being poled oppositely to the diodes of the other branch; and said diode pulse shaping network for providing the ramp pulses with flat sections at their zero crossover points for making the servo system insensitive to tape flutter errors falling within the flat sections of the ramp pulses.

6. A speed control servo system according to claim 1, further defined by said means for shaping the ramp pulses comprising two parallel-connected diode branches connected to the output of the ramp pulse generating means, each branch including at least one diode and the diodes of the respective branches being oppositely poled.

References Cited by the Examiner

UNITED STATES PATENTS

| | | | |
|---|---|---|---|
| 3,168,618 | 2/1965 | Soudermeyer | 318—314 X |
| 3,174,090 | 3/1965 | Hall | 318—314 |

BERNARD KONICK, *Primary Examiner.*

IRVING SRAGOW, *Examiner.*

R. M. JENNINGS, A. I. NEUSTADT, *Assistant Examiners.*